United States Patent
Kawabata et al.

(12)

(10) Patent No.: US 6,250,846 B1
(45) Date of Patent: Jun. 26, 2001

(54) APPARATUS FOR SOIL PURIFICATION AND REMEDIATION METHOD FOR CONTAMINATED SOIL

(75) Inventors: Yuji Kawabata, Isehara; Masatoshi Iio, Funabashi; Yuri Senshu, Kashiwa; Takeshi Handa, Funabashi, all of (JP)

(73) Assignees: Canon Kabushiki Kaisha; Raita Kogyo Co. Ltd., both of Tokyo (JP)

( * ) Notice: Subject to any disclaimer, the term of this patent is extended or adjusted under 35 U.S.C. 154(b) by 0 days.

(21) Appl. No.: 09/217,124

(22) Filed: Dec. 21, 1998

(30) Foreign Application Priority Data

Dec. 25, 1997 (JP) .................................................. 9-358270
Sep. 29, 1998 (JP) ................................................. 10-275759

(51) Int. Cl.⁷ .............................. B09C 1/00; B01F 7/00; B09B 3/00
(52) U.S. Cl. ................................. 405/128.45; 405/128.1; 405/128.15; 405/128.7; 366/150.1; 366/293; 366/296; 588/260; 588/900
(58) Field of Search ..................... 405/128, 258, 405/263, 128.1, 128.15, 128.45, 128.7, 258.1; 588/205, 206, 249, 260, 261, 900; 37/189; 366/150.1, 159.1, 293, 296; 175/385, 386, 391

(56) References Cited

U.S. PATENT DOCUMENTS

| 935,834 | * | 10/1909 | Bates et al. ........................ 366/296 |
| 1,027,531 | * | 5/1912 | Fay ...................................... 366/296 |
| 5,242,246 | * | 9/1993 | Manchak, III et al. ........... 405/128 |
| 5,340,570 |  | 8/1994 | Wong et al. . |
| 5,342,146 | * | 8/1994 | Cooper ............................... 405/128 |
| 5,347,070 |  | 9/1994 | Heath et al. . |
| 5,348,422 | * | 9/1994 | Manchak, III et al. ........... 405/128 |
| 5,435,176 |  | 7/1995 | Manchak, III ...................... 73/151 |
| 5,511,907 | * | 4/1996 | Tabasco ............................... 405/128 |
| 5,631,160 | * | 5/1997 | Bruso ............................... 435/262.5 |
| 5,639,182 | * | 6/1997 | Paris .................................... 405/128 |
| 5,678,639 | * | 10/1997 | Golden .................................. 172/52 |
| 5,690,173 | * | 11/1997 | Abdul et al. ......................... 166/268 |
| 5,830,752 | * | 11/1998 | Bruso ............................... 435/283.1 |
| 5,931,605 | * | 8/1999 | Toor et al. ........................... 405/258 |
| 5,988,947 | * | 11/1999 | Bruso .................................. 405/128 |
| 6,017,169 | * | 1/2000 | Toor et al. ........................... 405/258 |

FOREIGN PATENT DOCUMENTS

| 4003362 | 8/1991 | (DE) . |
| 4028055 | 3/1992 | (DE) . |
| 0453839 | 10/1991 | (EP) . |
| 0569199 | 11/1993 | (EP) . |
| 0620055 | 10/1994 | (EP) . |
| 112117 | 5/1995 | (JP) . |
| WO 86-01439 | 3/1986 | (WO) . |
| WO 92-13141 | 8/1992 | (WO) . |

OTHER PUBLICATIONS

Patent Abstracts of Japan, vol. 1998, No. 2, Jan. 1998 for JP 09–276894.

* cited by examiner

Primary Examiner—Thomas B. Will
Assistant Examiner—Gary S. Hartmann
(74) Attorney, Agent, or Firm—Fitzpatrick, Cella, Harper & Scinto (57) ABSTRACT

An apparatus for soil remediation to remedy a soil contaminated with a pollutant less affecting the environment, which includes a soil borer having a rotatable drilling form or portion capable of agitating the soil, introducing into the soil at least one agent selected from the group consisting of a microorganism capable of degrading the pollutant, a nutrient for the microorganism and an inducer to make the microorganism express the pollutant-degrading activity, and measuring pollutant concentration in the soil.

28 Claims, 2 Drawing Sheets

FIG. 1

APPARATUS FOR SOIL PURIFICATION AND REMEDIATION METHOD FOR CONTAMINATED SOIL

BACKGROUND OF THE INVENTION

1. Field of the Invention

The present invention relates to an apparatus for purifying contaminated soil and to a method for remedying soil contaminated with pollutants.

2. Related Background Art

Chlorinated aliphatic hydrocarbon compounds such as trichloroethylene, and aromatic compounds such as phenol, are chemically very stable, and have been used in a large amount as raw materials for chemical or as cleaning solvents for semiconductors or machinery because of their high solubility for grease. On the other hand, their carcinogenicity has been pointed out. Thus organic chlorinated compounds leaked or discarded into the environment have become a source of wide range environmental pollution over the world.

Since well water, especially, is used in large quantities for industrial/agricultural use as well as drinking water, survey of the soil and groundwater contamination and a measure therefor are required urgently.

The number of the chemical substances under regulation is increasing year by year, and now is the time to make every effort to remedy the polluted environment worldwide.

To purify the soil and groundwater contaminated with organic compounds, there are two approaches: physico-chemical approach and microbiological approach. For example, the physical/chemical approach includes heating or incinerating treatment of the dug-up contaminated soil, vacuum extraction of the pollutants from the contaminated soil, and aeration or adsorption treatment of the pumped-up contaminated groundwater. Neither of the vacuum extraction and pump-up aeration approaches, however, make the organic compounds harmless, requiring a further process to make them harmless.

On the other hand, the microbial remediation of the polluted environment (hereafter referred to as "bioremediation") has been attracting considerable attentions as a more eco-minded approach than physicochemical approaches, since it allows degradation of pollutants into essentially harmless substances. One embodiment of the bioremediation is in situ remediation treatment. This is to purify the contaminated soil by directly introducing a microorganism capable of degrading pollutants into the polluted environment (soil, groundwater etc.), by propagating the native microorganisms capable of degrading the pollutant in the polluted environment, or by directly introducing certain substances to elicit or improve the pollutant-degrading activity of the native microorganisms.

For example, DE 4003362 A1 discloses a purification method in which the contaminated soil is mechanically agitated and crushed to uniformly mix with a degrading microorganism and nutrients.

EP 0620055 A1 describes a method in which the contaminated soil is mechanically agitated while injecting compressed air and the exhausted gaseous pollutant is collected for purification.

DE4028055 A1 describes a purification method in which the contaminated soil is dug while sprinkling microorganisms to the soil.

Alternatively, there is an approach to move the pollutant such as organic chlorinated compounds in the environment. U.S. Pat. No. 5347070, for example, describes a method in which a plurality of electrodes are inserted into the soil polluted with organic chlorinated compounds and sending an electric current to the soil to raise the soil temperature, so that the pollutants are vaporized to be removed. Further, U.S. Pat. No. 5340570 discloses a method in which pollutants are removed by electroosmosis due to an electric field applied to the soil.

Japanese Patent Application Laid-Open No. 7-112177 discloses an apparatus for effective in situ remediation of polluted soil, which comprises soil-agitating means for agitating the soil while penetrating it, means for supplying the agitated soil with a dispersion of a microorganism, and means for supplying a material to activate the microorganism. Disclosed also is a method for remedying a contaminated soil by using this apparatus, which comprises steps of: boring and agitating the contaminated soil using a device capable of boring and agitating the soil, feeding the soil with a dispersion of a microorganism capable of treating the contaminated soil, and agitating the soil for a prescribed period of time while injecting a substance(s) to activate the microorganism. These steps as one cycle are repeated in different places according to the area and site of the contaminated soil. As described above, various types of in situ bioremediation have been proposed.

The present inventors have learned from the previous studies that it should be avoided as much as possible for the introduced foreign microorganism or compounds which do not originally exist in the soil but required for in situ bioremediation to affect the ecological system of the polluted environment, particularly after the remediation.

SUMMARY OF THE INVENTION

The present invention has been made from the above point of view. An object of the present invention is to provide an apparatus for purifying the contaminated soil which can diminish the influence on the ecological system of the environment to be remedied as much as possible carrying out in situ environmental remediation more effectively.

It is another objective of the present invention to provide a method for remedying contaminated soil which enables the control of the influence on the ecological system of the environment to be remedied as well as the effective purification of the polluted environment in situ.

The device for remediation of contaminated soil to achieve the above objects comprises the following means:

(a) excavating means for excavating the soil, (b) agitating means for agitating the soil, (c) feeding means for introducing into the soil at least one agent selected from the group consisting of a microorganism capable of degrading the pollutant, a nutrient for the microorganism and an inducer to make the microorganism express the pollutant-degrading activity; and (d) measuring means for measuring the pollutant concentration in the soil.

A method for remedying contaminated soil to achieve the above objectives comprises the steps of:

(1) excavating the soil contaminated with a pollutant, (2) agitating the soil, (3) measuring the pollutant concentration in the soil, and (4) introducing into the soil at least one agent selected from the group consisting of a microorganism capable of degrading the pollutant, a nutrient for the microorganism, and an inducer to make a microorganism express the pollutant degrading capability, wherein at least one of the steps (1), (2) and (4) is controlled according to the pollutant concentration obtained by the step (3).

By controlling the remedying treatment according to the sites and the pollutant concentration in the contaminated soil, it is possible to suppress the level of disturbance of the ecological system due to the introduced microorganism, nutrients or inducer. In addition, this method makes unnecessary to add the microorganism, nutrients or inducer superfluously to the soil, enabling more efficient remediation of the contaminated soil.

DETAILED DESCRIPTION OF THE PREFERRED EMBODIMENTS

A method of remedying contaminated soil according to one embodiment of the present invention is now described with reference to FIGS. 1 and 2. The soil to be remedied here consists of non aquifer 1, aquifer 2 and contaminated region 3. In general, pollutants gradually penetrate from the surface layer of the soil to the underground with rainwater, and pollutants in the non aquifer 1 slowly diffuse toward the aquifer 2. In case of water-soluble pollutants, having reached the aquifer 2 they will dissolve in groundwater, move with the groundwater current, and diffuse over a wide region. In case of hardly water-soluble pollutants such as halogenated aliphatic hydrocarbon compounds represented by trichloroethylene, they will accumulate in the non aquifer 1 and on the water surface of the aquifer 2, or at the bottom of the aquifer 2, resulting in the formation of the highly contaminated region 3, as shown in FIG. 1.

Figure 1:
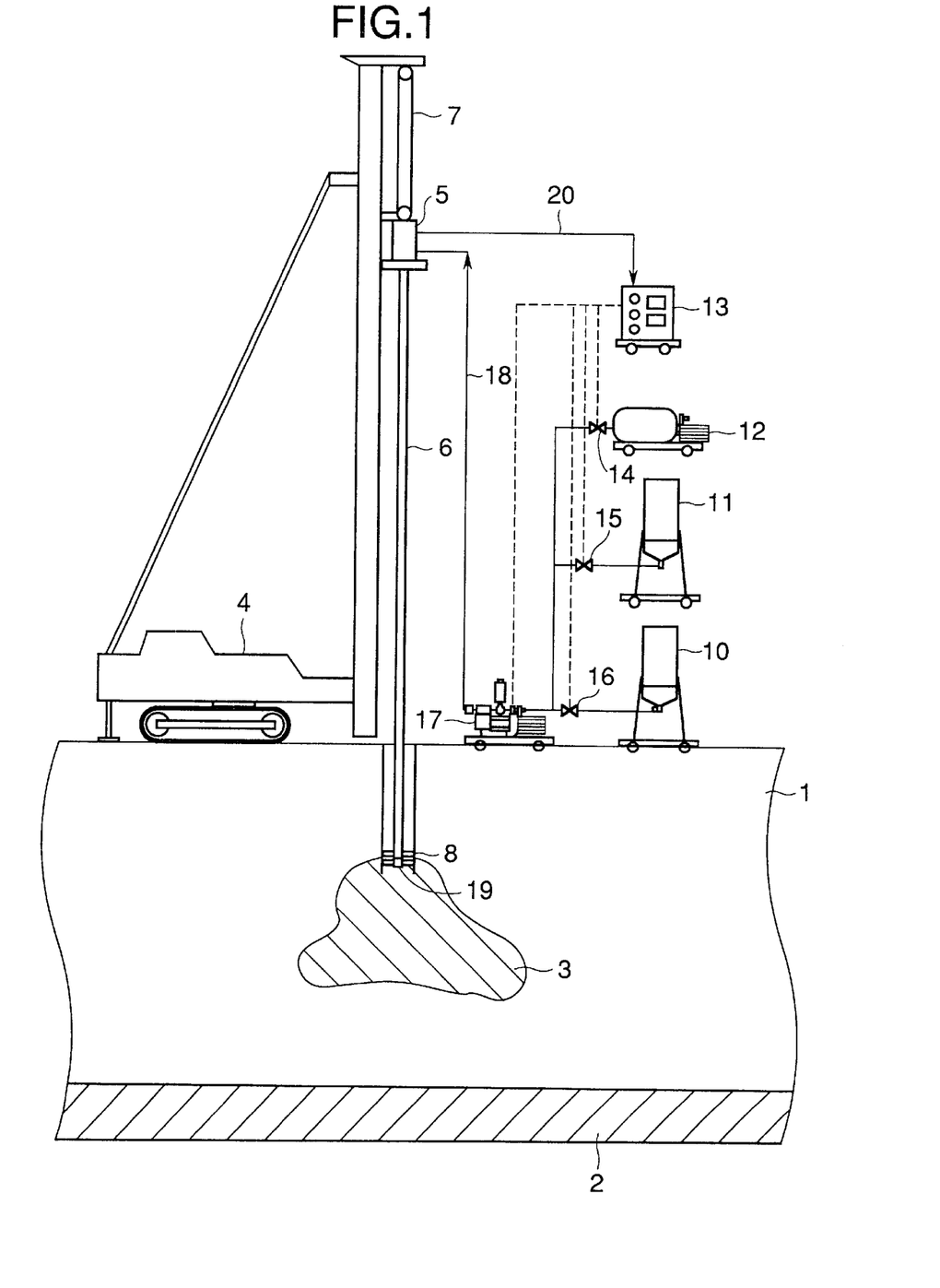
FIG. 1 is a schematic illustration of a method of remedying contaminated soil according to one embodiment of the present invention.

A soil remediation device of an embodiment of the present invention is described referring to FIG. 1. A rotary rod 6 attached to a motor 5 of a column unit 4 can be lowered into the soil while rotated by the motor 5 to excavate and stir the soil with a excavating and agitating means 8 mounted at the tip portion of the rotary rod 6. A suction means for collecting the pollutant in the soil is disposed on the very end of the rotary rod 6, and the pollutant is led through the inside of the rotary rod 6 via pipes 20 to a measuring and control means 13 for determining the concentration of the pollutant and/or oxygen (for example, a gas chromatograph) located on the ground. A tank 10 contains a liquid agent containing a microorganism capable of degrading the pollutant in the presence of an inducer (for example, a microorganism strain J1 (FERM BP-5102) which expresses an oxygenase activity required for degrading trichloroethylene on exposure to an inducer), a tank 11 contains a liquid agent containing an inducer which makes the microorganism express the pollutant-degrading activity or promotes the degradation activity. Air compressor 12 as well as the tanks 10 and 11 are connected to the rotary rod 6 via a pump 17 so that the microorganism, the inducer and air (oxygen) for the microorganism can be introduced through the inside of the rotary rod 6 into the soil from the tip of the rotary rod. Within pipes 18 connecting the pump 17 and each of the tank 10, tank 11 and air compressor 12, electromagnetic valves are disposed which can be opened and closed by the measuring and control means 13 to control the amounts of the microorganism, the inducer and air (oxygen) to be introduced into the soil depending on the pollutant concentration measured by the measuring and control means 13. The control means 13 can also control the rotation speed of the rotary rod, which enables the control of the descending speed of the rotary rod as well as the rotation speed of the agitating blades.

When such an apparatus is used in remediation of contaminated soil, the rotary rod 6 is lowered into the soil to excavate and stir the soil with continuous monitoring of the pollutant concentration, and when it is judged that the tip of the rotary rod has reached the top of the contaminated region, a predetermined amount of the microorganism as well as the inducer and air are introduced into the soil by the measuring and control means 13. At this point, the descending movement of the rod 6 may be stopped, and the still rotating agitating blades mix the introduced microorganism, inducer and air (herein after referred to as the treating agents) with the soil of the contaminated region. This ensures a high probability in contact between the pollutants in the contaminated region and consequently increases the soil remediation efficiency. Thus, one treating cycle comprises lowering the rotary rod with monitoring the pollutant concentration to control the descending speed of the rotary rod and the rotation speed of the agitating blades according to the monitoring results, and introducing the treating agents into the contaminated region until the tip of the rod 6 reaches the outside of the contaminated region, and raising the rod 6 without or with rotating the agitating blades, for example, in the opposite direction during excavation until the rotary rod is drawn from the soil. When the pollutant concentration in the contaminated region is still high, the same operation can be repeated at the same spot, or the rotary rod 6 may be moved up and down so as to stir the soil with the treating agents introduced thereto more thoroughly.

In addition, the treating agents may be also supplied into the soil while the rotary rod is ascending in the soil with rotation of the agitating blades. In such a case, it is preferable that another inlet for sucking pollutants is provided on the rotary rod above the outlet for the treating agents to monitor the pollutant concentration. This is because the introduction of the treating agents during extraction of the rotary rod 6 can also be carried out appropriately according to the pollutant concentration.

In the above embodiment of soil remediation, the treating agents are introduced into the soil while the rotary rod is descending into the soil. Alternatively, the treating agents are introduced into the soil when the rotary rod is pulled up in the soil, and while the rotary rod is lowered into the soil, only the agitating blades are rotated to agitate the contaminated region.

Figure 2:
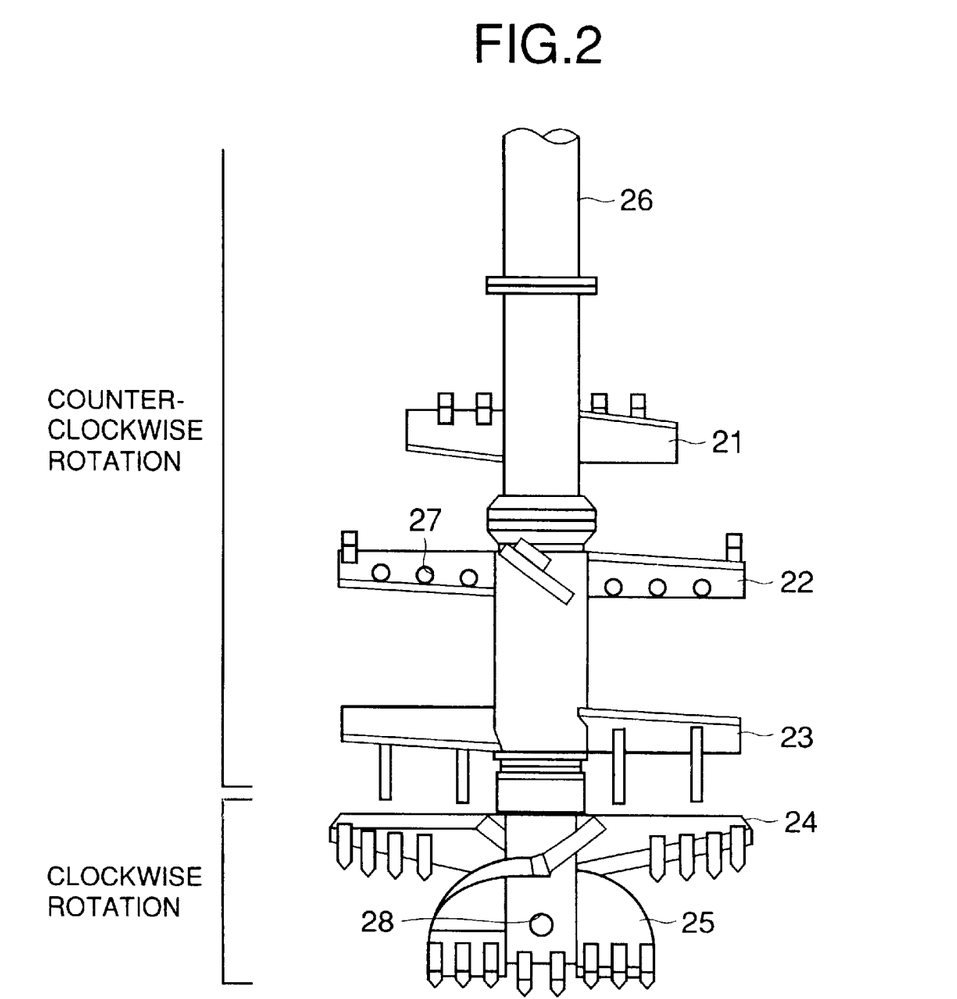
FIG. 2 is an enlarged view of the tip portion of the agitation rod of the device in FIG. 1 used for remedying contaminated soil.

FIG. 2 is an enlarged view of the tip portion of the rotary rod of the soil remediation device shown in FIG. 1. As shown in FIG. 2, the rotary rod 26 is provided with agitating blades 21, 22, 23 and 24, and the tip is provided with an agitating head 25 and an inlet 28 for sucking the pollutant. The rotary rod 26 is pressed against the ground by means of the wire 7 shown in FIG. 1, to excavate the soil by means of the rotating rotary rod and agitating head 25 driven by the motor 5. Preferably, the agitating head 25 and the agitating blade 24 disposed directly above the agitating head 25 rotate in a direction opposite to that of the agitating blades 21 to 23. Such a constitution may suppress the co-rotation of soil (rotation of soil together with the rotary rod leading to insufficient soil disturbance), and accordingly the soil in the contaminated region can be well agitated.

As a method for introducing the treating agents into the soil while the soil is excavated, a preferred embodiment is to provide outlets 27 for the treating agents on the agitating blades (for example, the agitating blade 22 in FIG. 2) other than the agitating blade 24 disposed directly above the agitating head 25, from which the treating agents are introduced into the soil. If the treating agents are introduced into the soil through the tip of the rotary rod during excavation, the microorganism may be crushed by the friction between the soil particles and the excavation means, e.g., the agitating head 25, or between particles themselves, or the heat generated by such friction may kill the microorganism and decompose the inducer, resulting in unsatisfactory soil remediation. On the other hand, when the treating agents are introduced into the soil through the outlets 27 disposed on the edge of the agitating blade 22, friction between the agitating blade 22 and the soil particles will not be so large, since the soil construction must have been already destructed by the agitating head 25 and the agitating blade 23. This will reduces the possibility of killing of the microorganism and of degeneration of the inducer. This is not applied to a case where the treating agents are introduced into the soil only during the extraction of the rotary rod from the soil.

The diameter of the agitating blades varies depending on the area and situation (e.g., urban or rural) of the contaminated region to be remedied, but it can be selected within the range from 800 mm to 2000 mm.

The inducer used for soil remediation in the embodiment described above with reference to FIGS. 1 and 2 varies depending on the microorganism to be used, for example, methane for methanotrophs; toluene, phenol, cresol etc. for aromatic-assimilating bacteria; and ammonium salts for nitrifying bacteria.

The treating agent containing the microorganism used for soil remediation in the embodiment described above may be prepared simply by dispersing a microorganism in water, where the microorganism inducibly or constitutively express an enzymatic activities to degrade the pollutant, but it is preferable to use a culture of the microorganism in a medium containing growth materials for the microorganism, and functional materials required for the microorganism to stably express pollutant-degrading activities. Growth materials are the nutrients for the microorganism, for example, carbon sources assimilable by the microorganism, as well as those contained in bouillon medium, M9 medium, L medium, malt extract, MY medium, nitrifying bacteria selective medium etc. Functional materials to maintain the degradation activities include the inducer.

The soil remediation device of the present invention is not limited to the constitution of the embodiment described above with reference to FIGS. 1 and 2 where the microorganism, air (oxygen) and the inducer are introduced into the soil from the end portions of the agitating blades. For example, injection of the inducer is not necessary when a microorganism constitutively expressing pollutant-degrading capability is used for soil remediation, or when the liquid agent contains the inducer to make the microorganism fully express the pollutant-degrading activities beforehand. Also in the above embodiment, air (oxygen) is used as a nutrient for the microorganism, but the present invention is not limited to it. For example, any carbon source which is assimilable by the microorganism may be introduced instead of air or with air in order to allow microorganism to survive or grow for a longer period of time in the soil. Otherwise, if the concentration of oxygen in the soil is sufficient for the microorganism, introduction of air can be omitted. Otherwise, if the long survival or growth of the microorganism in the soil is not desirable, no nutrients may not be introduced into the soil, which is also in a scope of the present invention. Assimilable carbon sources may be contained, for example, in bouillon medium, M9 medium, L medium, malt extract, MY medium, or nitrifying bacteria selective medium.

When the degradation of the pollutant is carried out by native microorganisms, microbial nutrients or an inducer which induces pollutant-degrading activities in them or both may be introduced into the soil, which is also in a scope of the present invention.

For degrading pollutants in the soil and groundwater more efficiently, a gas such as air or oxygen, and degradation-promoting substances may be mixed in the liquid agent after determining the pollutant concentration and oxygen concentration in the soil or ground water, as well as the concentrations of pollutant-degrading microorganism and carriers to immobilize the microorganism. If a sensor which can directly measure the pollutant is available, it may be directly mounted on the rotary rod.

Volatile pollutants and degradation products can be collected by gas sampling through the rotary rod to directly determine the concentration by a measuring means such as a gas chromatograph and a detector tube. Non-volatile or hardly-volatile pollutants and degradation products can be determined by liquid chromatography or photometry after pre-treating the soil samples. As with the volatile pollutants, the oxygen concentration can be determined with a gas chromatograph, a detector tube, or an oxygen sensor. The number of the pollutant-degrading microorganism can be counted by plate count method or flow cytometry, after treating the sampled carriers.

For degrading pollutants in the soil and groundwater more effectively, it is preferable to control the rotation speed of the agitating blades and the excavation- or extraction speed of the rotary rod not to mechanically damage the pollutant-degrading microorganism and carriers thereof. The optimal speeds also depends on the soil texture (gravel, sand, clay, etc.). When excavating hard soil, a considerable load is imposed on the agitating blades, which may damage the microorganism or carriers; in that case, it is desirable that the liquid agent is injected and mixed into the soil during the extraction of the rotating rod.

The pollutant which can be purified according to the present invention are not particularly limited so long as they are organic compounds degradable by microorganisms; however, but exemplified by aromatic compounds (for example, phenol, cresol, pentachlorophenol, polybiphenyl chloride, etc.) and halogenated aliphatic hydrocarbon compounds (for example, dichloroethylene, trichloroethylene, tetrachloroethylene, etc.).

Any microorganism can be used in the embodiment of the present invention so long as it expresses inducibly or constitutively an enzyme which degrades the pollutant in the soil to be remedied. It may be a wild type, an artificial mutant derived from the wild type, or one having an artificially mutated gene of the wild type. However, in view of in situ soil remediation, it is preferable to select a microorganism whose impact on the ecosystem intrinsic to the environment is as little as possible, that is, a wild type or an artificial mutant thereof. In order to minimize the impact on the ecosystem, it is preferable to use the pollutant-degrading microorganism which is an inhabitant of the soil to be remedied. As the microorganisms capable of degrading the organic compounds mentioned above include those belonging to the genera Saccharomyces, Hansenula, Candida, Micrococcus, Staphylococcus, Streptococcus, Leuconostoa, Lactobacillus, Corynebacterium, Arthrobacter, Bacillus, Clostridium, Neisseria, Escherichia, Enterobacter, Serratia, Achromobacter, Alcaligenes, Flavobacterium, Acetobacter, Moraxlla, Nitrosomonas, Nitrobacter, Thiobacillus, Gluconobacter, Pseudomonas, Xanthomonas and Vibrio whose degrading activities have been already established. As specific examples, there are strain J1 (FERM BP-5102) capable of degrading aromatic compounds and organic chlorinated compounds with an inducer, and a mutant strain derived from strain J1 by mutagen treatment, strain JM1 (FERM BP-5352) which can degrade these compounds without any inducer.

The microorganism may be suspended in a liquid agent after immobilized on carrier particles. Carrier particles are used to provide the microorganism with a comfortable habitat, to prevent predation by other microorganism and organisms and to prevent the diffusion and loss of the microorganism into groundwater. If the microorganism is directly introduced into the soil during soil agitation, cells are often broken to be killed due to the grinding of soil particles. In such a case, the microorganism may be immobilized on an appropriate carrier not to come into direct contact with the soil particles.

As a granular carrier, various types of microbial carriers can be used which have been utilized in pharmaceutical industries and food industries, or in bioreactors such as a waste-water treatment system. For example, granular carriers such as porous glass, ceramics, metal oxide, activated carbon, kaolinite, bentonite, zeolite, silica gel, alumina and anthracite; gel carriers such as starch, agar, chitin, chitosan, poly(vinyl alcohol), alginic acid, polyacrylamide, carrageenan, agarose and gelatin; polymer resins and ion-exchange resins such as cellulose, glutaraldehyde, poly (acrylic acid) and urethane polymer. In addition, natural or synthetic high-molecular compounds, for example, cotton, hemp and pulp materials whose principal component is cellulose, high-molecular acetate, polyester and polyurethane obtained by denaturing natural substances are also useful. Preferably carriers have a particle diameter sufficiently small to be uniformly mixed with the soil. In view of handling of carriers and the immobilization rate of the microorganism on carriers, desirably the diameter is about 0.01 mm to about 1 mm.

Now the present invention will be described with reference to the following embodiments, however it is our intention that the scope of the invention be not limited by any of the details of description.

EXAMPLE 1

Remediation of Phenol-Contaminated Soil by RAS Column Method Using Strain J1

(1) First, colonies of strain J1 were grown on agar plates of M9 medium supplemented with 0.1% yeast extract. Eight liter of M9 medium containing 0.1% monosodium glutamate was put into a 10 liter fermenter, to which added were 8 g of porous cellulose carrier (trade name: Viscopearl, from Rengo Co., Ltd.) of 0.1 mm particle diameter and of a density of 0.1 g/cm$^3$. The J1 colonies were inoculated into this medium, and cultured with agitation and aeration of the medium at 15° C. for about 2 days. At this point, part of cellulose carrier particles were taken out, and shaken vigorously in a fresh M9 medium so that the microorganism attached to the carrier would be detached. Then the number of the microorganism immobilized was counted by the plate count method. As a result, about $5 \times 10^9$ cells of strain J1 were immobilized per 1 cm$^3$ of carrier.

(2) Fine sand having a water content of 12% was mixed with phenol to a phenol concentration of 10 ppm based on the water in the fine sand. Then fine sand not containing phenol was filled into a drum (inner diameter: 56 cm, height: 85 cm) to the depth of 20 cm. Then, the fine sand containing phenol was layered 45 cm deep on the surface of the first sand layer, and again fine sand containing no phenol was layered 20 cm deep on it. Thus, a model contaminated soil was prepared.

(3) An apparatus for soil remediation was assembled as shown in FIGS. 1 and 2. Specifically, a rotary rod having a diameter of 40 mm and a length of 1200 mm was mounted with an agitating head having a diameter of 100 mm, agitating blades 22, 23 and 24 having a diameter of 200 mm and an agitating blade 21 having a diameter of 120 mm as shown in FIG. 2.

On the edge of the agitating blade 22, disposed were discharge openings for discharging the liquid agents contained in tanks 10 and 11. The agitating head 25 and agitating blade 24 were constructed so that they would rotate in a direction opposite to the rotation direction of the agitating blades 21, 22 and 23. A liquid agent containing 0.1 wt % of carrier on which cells of strain J1 prepared in the above description (1) were immobilized was put in the tank 11, and a liquid agent containing 10 wt % of monosodium glutamate as a nutrient was put in the tank 10. The device was constructed in such a manner that the tanks 10 and 11 containing the liquid agents were connected to a pump 17 via electromagnetic valves 15 and 16 which could be electromagnetically opened and closed by the measuring and control means 13 and the liquid agents are discharged from the discharge openings 27 of the agitating blade 22.

The device was constituted to have a pollutant-sucking opening at the tip of the rotary rod, so that the pollutant sucked from the opening was led through the inside of the rotary rod to a liquid chromatograph of the measuring and control means 13 for measuring the pollutant concentration.

(4) By rotating the rotary rod of the device described in (3) above at a speed of 5 revolution/min, the rod excavated at a speed of 100 mm/min and agitated the soil, monitoring the phenol concentrations. When the rotary rod bumped against the bottom of the drum, the descent and rotation of the rotary rod were stopped. The results of the monitoring revealed that the concentration of phenol in the drum was 0 ppm in the region of 0 to 20 cm from the surface of the soil, about 10 ppm in the region of 20 to 65 cm, and about 0 ppm in the region of 65 to 85 cm. Then rotating in the opposite direction, the rotary rod was raised. From the bottom to the 65 cm depth, the ascending speed of the rotary rod was 200 mm/min and the liquid agents of the tanks 10 and 11 were not discharged. While the tip of the rotary rod was ascending from 65 cm to 20 cm deep from the surface of the soil, the ascending speed of the rotary rod was set at 100 mm/min, and the liquid agents of the tank 10 and tank 11 were discharged from the discharge openings 27 at a rate of 50 ml/min and at a rate of 450 ml/min, respectively. While the tip of the rotary rod was ascending from the point of 20 cm deep to the very surface of the soil, the ascending speed of the rotary rod was set at 200 mm/min without the discharge of the liquid agents.

(5) After leaving the drum standing for one day, the concentration of phenol in the dug region of the soil was measured at the points of 30 cm and 60 cm deep from the soil surface as well as at the bottom of the drum, according to the method specified in the Japanese Industrial Standard (JIS), K012-1993, 28-1. The results showed that the concentration of phenol was 0.2 ppm at each point, which indicated that soil remediation there was completed. On the other hand, for the points where the soil was not dug and agitated, the concentration of phenol was 9.7 ppm at points of 35 cm and 50 cm deep from the surface of the soil. In this experiment, 2.25 liters of the liquid agent containing strain J1 was used.

Comparative Example 1

A soil remediation experiment was carried out in the same manner as Example 1 except that the ascending speed of the rotary rod was fixed at 100 mm/min and the liquid agents were discharged continuously during ascending. The results was that, the concentration of phenol was 0.2 ppm at each point, and the amount of the consumed liquid agent containing microorganism in this experiment was 4.25 liters.

Comparative Example 2

A soil remediation experiment was carried out in the same manner as Example 1 except that the ascending speed of the rotary rod was fixed at 100 mm/min, and the liquid agents of the tank 10 and the tank 11 were discharged continuously at a rate of 26 ml/min and of 234 ml/min, respectively. The total injection amount of the liquid agent of the tank 11 was adjusted so as to be almost the same as that used in Example 1. As a result, the average of the phenol concentrations at the points 35 cm deep and 50 cm deep from the surface of the soil was as high as about 3.2 ppm, which indicated that soil remediation was not completed.

EXAMPLE 2
Injection of Microorganism During Excavation

A soil remediation experiment was carried out in the same manner as in Example 1 a soil microorganism and nutrients for the microorganism were introduced into the soil during excavation, between 20 cm and 65 cm deep from the surface.

As in Example 1, the result showed complete soil remediation. The average concentration of strain J1 at the phenol concentration determination points was $8 \times 10^6$ cells/g soil by the plate count method.

Comparative Example 3

The device prepared in the Example 1-(3) was remodeled so that the liquid agents of the tanks 10 and 11 would be discharged from the tip of the rotary rod. A soil remedying experiment was carried out in the same manner as in Example 2 except that this remodeled device was used. The experimental results showed that the concentrations of phenol at the points 35 cm deep and 50 cm deep from the soil surface were 1.8 ppm and 2.2 ppm, respectively, indicating that soil remediation was not proceeded effectively. The average concentration of strain J1 was $1 \times 10^6$ cells/g soil. It was visually confirmed that porous cellulose carrier particles had been crushed in the soil.

From these results, it is concluded that the microorganism introduced into the soil were crushed between the agitating head etc. and the soil particles, and a considerable number of microorganism were killed.

EXAMPLE 3
Experiment on Remediation of Trichloroethylene-Contaminated Soil Using Strain JM1

(1) Strain JM1 (FERM BP-5352) were spread and grown to form colonies on an agar plate of M9 medium supplemented with 0.1% yeast extract. Eight liters of M9 medium containing 2.0% monosodium glutamate was put into a 10 liter fermenter, and 15 g of porous cellulose (trade name: Viscopearl; product of Rengo Co., Ltd.) of 0.1 mm particle diameter and of a density of 0.1 g/cm$^3$. The JM1 colonies were inoculated into this medium, and cultured with agitation and aeration of the medium at 15° C. for about 2 days. At this point, part of cellulose carrier particles were taken out, and shaken vigorously in a fresh M9 medium so that the microorganism attached to the carrier would be detached. Then the number of the microorganism immobilized was counted by the plate count method. As a result, about $3 \times 10^9$ cells of strain J1 were immobilized per 1 cm$^3$ of the carrier.

(2) Fine sand having a water content of 12% was mixed with trichloroethylene (TCE) to a TCE concentration of 10 ppm based on the water in the fine sand. Then fine sand not containing TCE was filled into a drum (inner diameter: 56 cm, height: 85 cm) to the depth of 20 cm. Then, the fine sand containing TCE was layered 45 cm deep on the surface of the first sand layer, and again fine sand containing no TCE was layered 20 cm deep on it. Thus, a model TCE-contaminated soil was prepared.

(3) An apparatus for soil remediation was prepared in the same manner as in Example 1, except that the tank 11 did not contain a liquid agent containing 0.2 wt % of the carrier particles on which cells of strain JM1 had been immobilized, and no liquid agent was put in the tank 10. The device was constituted to have a pollutant-sucking opening at the tip of the rotary rod, so that the pollutant sucked from the opening at a flow rate of 1 ml/min was led through the inside of the rotary rod to a liquid chromatograph (Microsensor Technology, M200) of the measuring and control means 13 for on line measurement of the pollutant concentration.

(4) By rotating the rotary rod of the device described in (3) above at a speed of 4 revolution/min, the rod excavated at a speed of 60 mm/min and agitated the soil, monitoring the TCE concentrations. When the rotary rod bumped against the bottom of the drum, the descent and rotation of the rotary rod were stopped. The results of the monitoring revealed that the concentration of TCE in the drum was less than 0.1 ppm in the region of 0 to 20 cm from the surface of the soil, about 5 ppm in the region of 20 to 65 cm, and less than 0.1 ppm in the region of 65 to 85 cm. Then rotating in the opposite direction, the rotary rod was raised. From the bottom to a depth of 65 cm, the ascending speed of the rotary rod was 120 mm/min and the liquid agent of the tank 11 was not discharged. While the tip of the rotary rod was ascending from 65 cm to 20 cm deep from the surface of the soil, the ascending speed of the rotary rod was set at 60 mm/min, and the liquid agent of the tank 11 was discharged from the discharge openings 27 at a rate of 300 ml/min. While the tip of the rotary rod was ascending from the point 20 cm deep to the very surface of the soil, the ascending speed of the rotary rod was set at 120 mm/min without the discharge of the liquid agent of the tank 11.

(5) After leaving the drum standing for one day, TCE was extracted with hexane from the agitated fine sand taken from the points 35 cm deep, 50 cm deep from the soil surface and the bottom of the drum, and the TCE concentrations were measured using a gas chromatograph (trade name: GC-14B; Shimadzu Corporation). The result showed that the TCE concentration was 0.1 ppm or less at each point, which indicated that soil remediation there was completed. On the other hand, at the points where the soil had not been excavated and agitated, the TCE concentrations at points 35 cm and 50 cm deep from the surface of the soil were 4.7 ppm. In this experiment, the amount of the consumed liquid agent containing strain JM1 was 2.25 liters.

Comparative Example 4

A soil remediation experiment was carried out in the same manner as in Example 3 except that the ascending speed of the rotary rod was fixed at 60 mm/min and the liquid agent was discharged continuously during ascending. As a result, the TCE concentration was 0.1 ppm or less at each point, but the amount of the consumed liquid agent containing the microorganism was 4.25 liters.

Comparative Example 5

A soil remediation experiment was carried out in the same manner as Example 3 except that the ascending speed of the rotary rod was fixed at 100 mm/min, and the liquid agent of the tank 11 was discharged continuously at a rate of 160 ml/min. The total injection amount of the liquid agent of the tank 11 was adjusted so as to be almost the same as that used in Example 3. As a result, the average of the TCE concentrations at the points 35 cm deep and 50 cm deep from the surface of the soil was as high as about 1.8 ppm, which indicated that soil remediation was not completed.

EXAMPLE 4
Injection of Microorganism During Soil Excavation

A soil remediation experiment was carried out in the same manner as in Example 3 except that the microorganism was introduced into the soil at a rate of 300 ml/min during excavation from a depth of 20 cm to a depth of 65 cm from the surface.

Similar to Example 3, the results showed that soil remediation was completed. The average concentration of strain JM1 at the TCE concentration determination points was $5 \times 10^6$ cells/g soil by the plate count method.

Comparative Example 6

A soil remediation experiment was carried out in the same manner as in Example 4 except that the device was that used in Comparative Example 3, and the liquid agent of the tank 11 was discharged from the tip of the rotary rod during excavation. The result was that the TCE concentrations at the points 5 cm deep and 50 cm deep from the surface were 2.4 ppm and 7 ppm, respectively, indicating that soil remediation was not proceeded effectively. The average concentration of strain JM1 at these points was $7 \times 10^5$ cells/g soil. Visual observation of the soil confirmed that porous cellulose carrier particles had been crushed. It is concluded from these results that strain JM1 introduced into the soil were crushed between the agitating head etc. and soil particles, and a considerable number of microorganism were killed.

EXAMPLE 5
Remediation of Trichloroethylene-Contaminated Soil Using Strain J1

(1) Carrier particles on which strain J1 cells were immobilized were prepared in the same manner as in Example 1-(1).

(2) A model TCE-contaminated soil was prepared in the same manner as in Example 3-(2).

(3) The same device for soil remediation as in Example 1-(3) was used except that the tank 11 contained a liquid agent containing 0.1 wt % of carrier particles on which strain J1 cells had been immobilized, and the tank 10 contained an aqueous solution of 0.5 wt % phenol as the inducer for strain J1.

(4) By rotating the rotary rod of the device described in (3) above at a speed of 4 revolutions/min, the rod excavated at a speed of 60 mm/min and agitated the soil, monitoring the phenol concentrations. When the rotary rod bumped against the bottom of the drum, the descent and rotation of the rotary rod were stopped. The results of the monitoring revealed that the TCE concentration in the drum was 0.1 ppm or less in the region of 0 to 20 cm deep from the surface of the soil, about 5 ppm in the region of 20 to 65 cm, and 0.1 ppm or less in the region of 65 to 85 cm. Then rotating in the opposite direction, the rotary rod was raised. From the bottom to the 65 cm depth, the ascending speed of the rotary rod was 120 mm/min and the liquid agents of the tanks 10 and 11 were not discharged. While the tip of the rotary rod was ascending from 65 cm to 20 cm deep from the surface of the soil, the ascending speed of the rotary rod was set at 60 mm/min, and the liquid agents of the tank 10 and tank 11 were discharged from the discharge openings 27 at a rate of 30 ml/min and at a rate of 270 ml/min, respectively. While the tip of the rotary rod was ascending from the point of 20 cm deep to the very surface of the soil, the ascending speed of the rotary rod was set at 120 mm/min without the discharge of the liquid agents.

(5) After leaving the drum standing for one day, the concentrations of phenol and TCE in the excavated region of the soil was measured at the points of 30 cm and 60 cm deep from the soil surface as well as at the bottom of the drum. As a result, the concentrations of phenol and TCE were 0.1 ppm or less at each point, indicating that soil remediation there was completed. In this experiment, 2.25 liters of the liquid agent containing strain J1 was used.

As described above, according to various embodiments of the present invention, in situ remediation of soil contaminated with organic compounds can be performed very efficiently.

Moreover, according to the present invention, introduction of a microorganism into soil can be carried out effectively, which allows to lower the cost of in situ remediation of the contaminated soil.

What is claimed is:

1. An apparatus for soil remediation to remedy a soil contaminated with a pollutant, comprising:
   (a) a soil borer having a rotatable drilling portion with a soil agitating means; wherein the soil borer comprises a rotary rod and an agitating head provided at a tip thereof, wherein the soil agitating means comprises a plurality of agitating blades rotatably mounted at an intermediate portion of the rotary rod, and wherein the agitating head and one of the agitating blades next thereto rotate in one direction, and the rest of the plurality of agitating blades rotate in an opposite direction;
   (b) feeding means for introducing into the soil at least one agent selected from the group consisting of a microorganism capable of degrading the pollutant, a nutrient for the microorganism and an inducer to make the microorganism express the pollutant-degrading activity; and
   (c) measuring means for measuring pollutant concentration in the soil.

2. The apparatus for soil remediation according to claim 1, further comprising a control means for controlling at least one of the soil borer, the soil borer agitating means, and the feeding means, according to the pollutant concentration measured by the measuring means.

3. The apparatus for soil remediation according to claim 2, wherein the control means controls at least one of descending speed and ascending speed of the soil borer in the soil.

4. The apparatus for soil remediation according to claim 2, wherein the control means controls soil agitating speed of the agitating means.

5. The apparatus for soil remediation according to claim 1, wherein the feeding means comprises a discharge opening disposed at an edge of one or more of the agitating blades other than the agitating blade next to the agitating head, means for connecting the discharge opening and a tank containing at least one agent, and means for delivering the agent to the discharge opening.

6. The apparatus for soil remediation according to claim 1, wherein the feeding means comprises a discharge opening disposed on an edge of an agitating blade, means for connecting the discharge opening and a tank containing at least one agent, and means for delivering at least one agent to the discharge opening.

7. The apparatus for soil remediation according to claim 6, wherein the means for connecting the tank and the discharge opening is housed in the rotary rod.

8. A method for remedying a soil contaminated with a pollutant comprising the steps of:
(1) boring into a soil with a rotatable drill having a soil agitator; wherein the rotatable drill comprises a rotary rod having a plurality of agitating blades rotatably mounted at an intermediate portion of the rod and an agitating head provided on a tip portion thereof, and wherein the soil agitator comprises an agitating blade next to an agitating head rotating in an opposite direction to the plurality of agitating blades;
(2) measuring pollutant concentration in the soil; and
(3) introducing into the soil at least one agent selected from the group consisting of a microorganism capable of degrading the pollutant, a nutrient for the microorganism, and an inducer to make the microorganism express the pollutant degrading activity;
wherein at least one of the steps (1) and (3) is controlled according to the pollutant concentration determined by the step (2).

9. The method for soil remediation according to claim 8, wherein the step (1) comprises making the rotatable drill penetrate into the soil at a first speed, or making the rotatable drill penetrate into the soil at a first speed and then extracting the rotatable drill from the soil at a second speed.

10. The method for soil remediation according to claim 9, wherein at least one of the first and second speeds is controlled according to the pollutant concentration determined by the step (2).

11. The method for soil remediation according to claim 9, wherein the step (3) is carried out along the step (1): at least while making the rotatable drill penetrate into the soil at a first speed, or while extracting the rotatable drill from the soil at a second speed.

12. The method for soil remediation according to any one of claims 8, wherein rotation speed of the agitating blades is controlled according to the pollutant concentration determined by the step (2).

13. The method for soil remediation according to claim 8, wherein the step (2) comprises measuring the concentration of the pollutant or the pollutant in a medium sucked from a suction opening disposed at a tip portion of the rotary rod by using measuring means connected with the suction opening for measuring the pollutant concentration.

14. The method for soil remediation according to any one of claims 12, wherein the step (3) comprises introducing into the soil through a discharge opening provided on an edge of one or more of the agitating blades at least one agent by using means for delivering the agent to the discharge opening from a tank containing the agent.

15. The method for soil remediation according to claim 14, wherein an amount of the agent introduced into the soil in the step (3) is controlled according to the pollutant concentration determined by the step (2).

16. The method for soil remediation according to claim 8, wherein the step (3) is carried out while rotatable drill for excavating soil which comprises a rotating rod, and a rotating head mounted at the tip portion of the rotating rod is penetrating into the soil at a first speed in the step (1), the step (1) is carried out by rotating a plurality of agitating blades rotatably mounted at an intermediate portion of the rotary rod, and the step (3) is carried out by introducing at least one agent into the soil from a tank containing the agent through a discharge opening provided on an edge of one or more of the agitating blades other than the agitating blade next to the agitating head.

17. The method for soil remediation according to claim 8, wherein the pollutant is an organic compound.

18. The method for soil remediation according to claim 17, wherein the organic compound is an aromatic compound.

19. The method for soil remediation according to claim 18, wherein the aromatic compound is a phenol compound.

20. The method for soil remediation according to claim 17, wherein the organic compound is a halogenated aliphatic hydrocarbon.

21. The method for soil remediation according to claim 20, wherein the halogenated aliphatic hydrocarbon is dichloroethylene or trichloroethylene.

22. The method for soil remediation according to claim 8, wherein the microorganism is a wild type microorganism.

23. The method for soil remediation according to claim 22, wherein the microorganism is strain J1 (FERM BP-5102).

24. The method for soil remediation according to claim 8, wherein the microorganism is a mutant of a wild type microorganism strain.

25. The method for soil remediation according to claim 24, wherein the mutant is strain JM1 (FERM BP-5352).

26. The method for soil remediation according to claim 8, wherein the nutrient includes oxygen.

27. An apparatus for soil remediation to remedy a soil contaminated with a pollutant, comprising:
(a) a soil borer having a rotatable drilling portion with soil agitating means comprising a rotary rod provided with an agitating head at the tip thereof and a plurality of blades mounted at the rotary rod; and
(b) feeding means for introducing into the soil at least one agent selected from the group consisting of a microorganism capable of degrading the pollutant, a nutrient for the microorganism and an inducer to make the microorganism express the pollutant-degrading activity, wherein the agitating head and one of the blades next thereto rotate in one direction, and the rest of the blades rotate in an opposite direction.

28. A method for remedying a soil contaminated with a pollutant comprising the steps of:
(1) boring into a soil with a rotatable drill having a soil agitator comprising a rotary rod provided with an agitating head at the tip thereof, and a plurality of blades mounted at the rotary rod, wherein the agitating head and one of the blades next thereto rotate in a first direction, and the rest of the blades rotate in a second direction opposite to the first direction; and
(2) introducing into the soil at least one agent selected from the group consisting of a microorganism capable of degrading the pollutant, a nutrient for the microorganism, and an inducer to make the microorganism express the pollutant degrading activity.

* * * * *

UNITED STATES PATENT AND TRADEMARK OFFICE
CERTIFICATE OF CORRECTION

PATENT NO. : 6,250,846 B1
DATED : June 26, 2001
INVENTOR(S) : Yuji Kawabata et al.

It is certified that error appears in the above-identified patent and that said Letters Patent is hereby corrected as shown below:

Column 6,
Line 43, "pollutant" should read -- pollutants --.

Column 7,
Line 54, "added were" should read -- were added --.

Column 9,
Line 11, "was" should read -- were --;
Line 31, "a soil" should read -- except that the --;
Lines 53 and 56, "microorganism" should read -- microorganisms --.

Column 11,
Line 45, "microorganism" should read -- microorganisms --.

Column 12,
Line 64, "soil agitating" should read -- agitating --; and
Line 65, "agitating" should read -- soil agitating --.

Column 13,
Lines 48 and 58, "any one" should be deleted;
Line 49, "of claims 8," should read -- claim 8, --;
Line 59, "of claims 12," should read -- claim 12, --.

Signed and Sealed this

Twenty-sixth Day of February, 2002

Attest:

Attesting Officer

JAMES E. ROGAN
Director of the United States Patent and Trademark Office